United States Patent Office 3,430,650
Patented Mar. 4, 1969

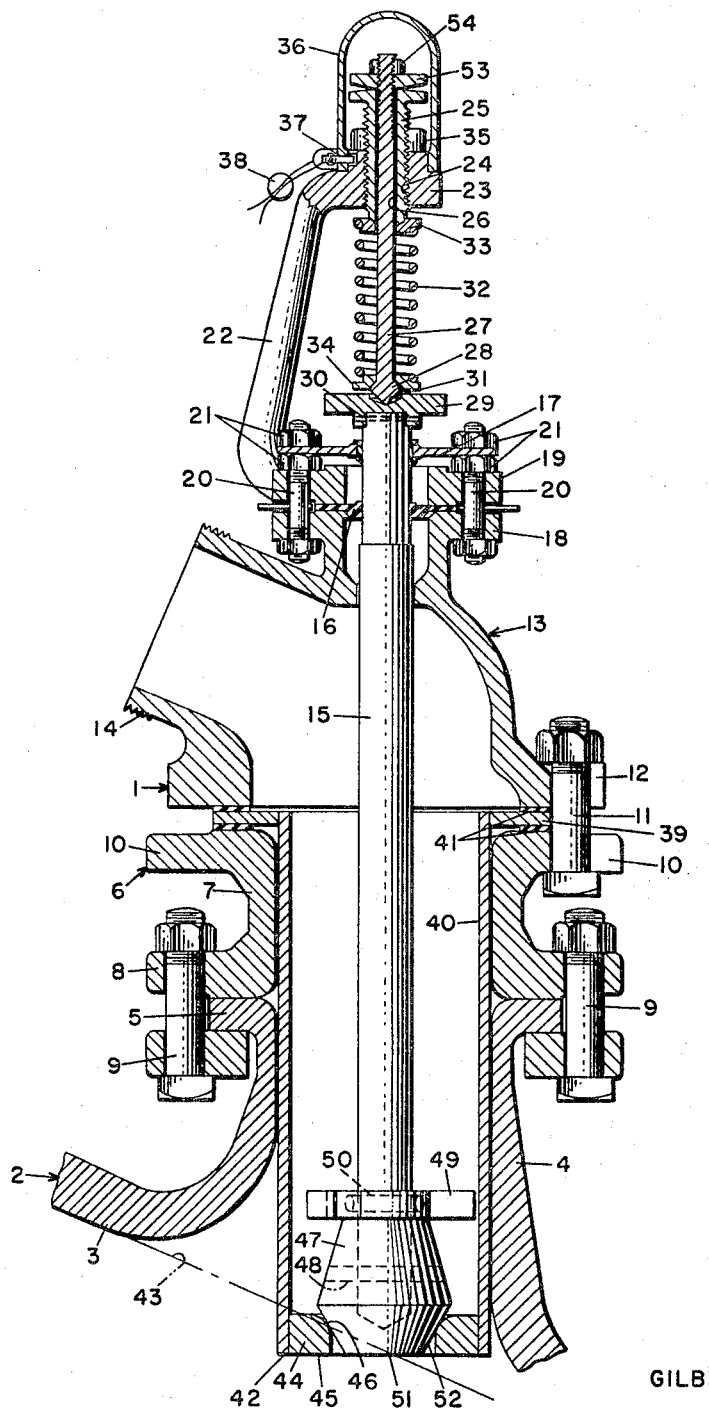
GILBERT E. CAIN
INVENTOR.
BY
Ernest G. Peterson
AGENT

3,430,650
RELIEF VALVE
Gilbert E. Cain, Wilmington, Del., assignor to Hercules Incorporated, a corporation of Delaware
Filed Feb. 18, 1966, Ser. No. 528,528
U.S. Cl. 137—535                2 Claims
Int. Cl. F16k 17/08, 27/00, 51/00

ABSTRACT OF THE DISCLOSURE

This invention relates to a safety valve adapted for use in a polymerizer and particularly to a safety valve designed to avoid spaces wherein polymerizing material can be deposited or accumulate and thereby foul operation of the valve. The valve includes a sleeve secured to the valve body by a fitting and carrying the valve seat at its input end, and a valve head cooperating with the valve seat. The sleeve provides for mounting the valve head and seat flush with the inner surface of the vessel and for preassembling the valve unit and for assembling the same with respect to existing vessels.

---

The present invention relates to a safety valve and has for a primary object to provide a safety valve which when used, for example, in a polymerizer for manufacturing polyethylene, will not become fouled by the deposition of the polymerizing material at the inlet of the valve.

Further objects of this invention are to provide such a safety valve which is adapted for use with existing equipment and which is relatively inexpensive, easy to install, and is durable and reliable.

The safety valve in accordance with this invention comprises basically a valve inlet extension in the form of a sleeve that is adapted to be inserted into the valve-receiving nozzle of a vessel to the point where the innermost end thereof is substantially flush with the inner surface of the top wall of the vessel, the valve seat and the valve head being disposed at and substantially flush with the innermost end of the sleeve. In this manner, the valve can be readily adapted for use with vessels having nozzle-like openings, while at the same time eliminating any pockets at the inlet to the valve in which material could be deposited and in which it could harden and thus clog or seal the inlet to the valve.

With the above and other objects in view, a presently preferred embodiment of the present invention is hereinafter described in connection with the accompanying drawing in which:

FIG. 1 is a sectional view axially through a valve constructed in accordance with this invention and illustrating a fragmentary portion of the vessel in which it is mounted.

With reference to the drawing, the present invention is illustrated as embodied in a valve 1 that is on a vessel 2, which may be a polymerizer for the polymerization of plastic materials such as polyethylene. The vessel 2 has a top wall 3 and a nozzle 4 projecting from the wall 3 and terminating in an opening surrounded by a valve-receiving flange 5.

The valve 1 includes a fitting 6 having a cylindrical side wall 7 with an internal diameter substantially the same as that of the opening of the nozzle 4. At the one end of the side wall 7 there is provided a valve-mounting flange 8 that is adapted to be seated on the valve-receiving flange 5 of the nozzle 4 and to which it is releasably secured by bolts 9. At the other end of the side wall 7, the fitting 6 is provided with a valve-assembly flange 10.

Mounted on the valve-assembly flange 10 of the fitting 6 and releasably secured thereto by bolts 11 is the assembly flange 12 at the inlet of a valve body 13 which is provided, for example with an externally threaded outlet 14 adapted to be coupled to a discharge pipe (not shown). Mounted in the valve body 13 for endwise sliding is a valve stem 15 that is arranged coaxially of the opening of the nozzle 4. At its end remote from the inlet end of the valve, the valve stem extends slidably through and is guided and sealed by a diaphragm 16 and a disc 17. The diaphragm 16 is sandwiched between a flange 18 on the valve body 13 and a collar 19 that is secured thereto by bolts 20. The disc 17 is mounted on the ends of the bolts 20 between the nuts 21.

The collar 19 is a part of and integral with a bracket 22 that extends in the direction of but spaced from the axis of the valve stem 15 and at its free end is provided with a head 23 that is disposed over the end of the valve stem 15 and is provided with a threaded bore 24 coaxial with the stem 15. A sleeve-like abutment element 25 is threaded into the bore 24 and in turn has a bore 26 that loosely receives a rod 27. At its lower end, the rod 27 is provided with a head 28 that bears against a cap 29 secured as by a pin 30 on the end of the valve stem 15, the cap 29 having a seat 31 for receiving the pointed end of the head 28. The rod 27 is biased in the direction of the stem 15 by a compression spring 32 that is coiled about the rod 27 and abuts at its opposite ends against spring seats 33 and 34 which engage respectively the end of the abutment element 25 and the head 28. The compression of the spring 32 is adjusted by turning the abutment element 25 which, through its threaded connection in the bore 24, raises and lowers the spring seat 33 relative to the top of the stem 15. The abutment element 25 is locked in its adjusted position by a lock nut 35 and, to prevent unauthorized or inadvertent adjustment of the setting, the parts are enclosed by a dome 36 that is locked in place by a pin 37 which is in turn locked by a frangible seal 38.

Disposed between the valve-assemby flange 10 of the fitting 6 and the assembly flange 12 of the valve body 13 is the mounting flange 39 at the end of a sleeve 40, gaskets 41 being interposed between the flange 39 and the flanges 10 and 12 to accommodate limited misalignment of the flanges while maintaining the seal. The flange 39 is thus secured by the bolts 11 and support the sleeve 40 in the nozzle 4 of the vessel 2. The sleeve 40 has an external diameter that is less than the internal diameter of the fitting 6 and the nozzle 4 so that it will be readily received therein and has a length relative to the fitting 6 and the nozzle 4 so that the free or inlet end 42 is disposed substantially at or flush with the inner surface 43 of the vessel.

Mounted internally of the sleeve 40 at the inlet end 42 thereof is an annular valve seat 44 defining the valve opening and having a flat exposed end wall 45 flush with the end 42 of the sleeve 40 and a curved seating surface 46 that is adapted to receive a valve head 47 for closing the valve opening at the inlet end of the sleeve. The valve head 47 is pinned on the end of the stem 15 by a pin 48, the end of the stem being guided axially of the sleeve 40 by a spider 49 secured to the stem 15 by a pin 50 and having laterally extending legs that slidably engage the inside wall of the sleeve 40. The head 47 is formed with a flat end wall 51 and a frusto-conical side wall 52 that is dimensioned relative to the diameter of the opening in the valve seat 44 and the distance from the seating surface 46 to the end wall 45 so that, with the head 47 seated on the surface 46 with an optimum pressure, the end wall 51 is substantially flush with the end wall 45 of the seat 44. The pressure of the head 47 on the seat 44 is adjusted by a nut 53 threaded onto the upper end of the rod 27 and locked in adjusted position by a lock nut 54, the adjusting nut 53 acting to engage the end of the abutment member 25.

The maximum diameter of the head 47, which is at the top of the conical side wall 52, is greater than the valve opening in the valve seat 44 and is dimensioned relative to the inside diameter of the sleeve 40 to provide an annular passageway that has substantially the same capacity, i.e., cross-sectional area, as the valve opening in the valve seat 44.

The valve constructed in accordance with this invention is adapted to be readily applied to the nozzle 4 of the vessel by inserting the sleeve 40 of the assembly into the nozzle 4. When assembled, not only is the valve head disposed substantially flush with the inner surface of the wall 3 of the vessel, but it also presents a substantially flush face. Thus, regardless of the shape of the nozzle of the vessel, there is no opportunity for the deposition within the nozzle 4 of any material which would clog the valve opening and preclude operation of the valve. The shape of the valve head 47 relative to the valve seat 44, which is relatively simple and, therefore, cheap to manufacture, also aids significantly in preventing fouling of the valve. The tapered side wall of the conical surface 52, coupled with the seating surface 46, provides for adjustment of the end wall 51 of the valve head 47 to make the same flush with the end wall 45 of the valve seat 44 and the end 42 of the sleeve 40. Thus, there are substantially no protected surfaces or recesses within the valve itself in which material can be deposited and those protected surfaces that do exist are small and do not prevent operation of the valve since the movement of the conical side wall 52 of the valve head 47 is not hindered by the accumulation of any matreial between it and the valve seat 44.

What I claim and desire to protect by Letters Patent is:

1. A safety valve for a vessel having a wall and a nozzle projecting from said wall and terminating in a valve-receiving flange, said valve comprising a valve body, a sleeve secured to said valve body with the outlet of said sleeve in communication with the inlet of the valve body, means for securing said valve body on the valve-receiving flange with said sleeve extending into the nozzle of the vessel, said sleeve having a length relative to the nozzle to position the inlet end thereof substantially at the inner surface of the wall of the vessel, an annular valve seat at the inlet end of said sleeve and defining the valve opening, said valve seat having an end wall substantially flush with the inlet end of said sleeve, a valve stem, a valve head carried by said valve stem, means for mounting said valve stem axially of said sleeve for endwise movement in the direction toward the inlet end of said sleeve into a closed position wherein said valve head cooperates with said valve seat to close the valve opening and for endwise movement in the opposite direction into an open position wherein said valve head is open relative to said valve opening and is disposed in said sleeve intermediate the inlet and outlet ends thereof, said valve head having a maximum diameter less than the internal diameter of said sleeve to provide an annular passageway about said valve head in said sleeve when said valve head is in the open position, means for yieldingly biasing said valve stem into the closed position to hold said valve head on said seat against fluid pressure in the vessel, said valve head having a seating surface adapted to cooperate with said seat and an end wall substantially flush with the inlet end of said sleeve when said valve head is seated on said seat.

2. A safety valve in accordance with claim 1 in which said means for securing said valve body on said valve-receiving flange comprises a fitting having a side wall, a mounting flange at one end of said side wall and adapted to be seated on and releasably secured to said valve-receiving flange, and a valve assembly flange at the other end of said side wall, and said valve body is mounted upon and releasably secured to said valve-assembly flange, and in which said sleeve is secured to said valve body by means of a mounting flange at the outlet end thereof that is disposed and thereby secured between said valve body and said valve-assembly flange.

References Cited

UNITED STATES PATENTS

| | | | |
|---|---|---|---|
| 1,765,272 | 6/1930 | Hougland | 251—144 |
| 2,595,671 | 5/1952 | Greene | 137—536 X |
| 2,773,720 | 12/1956 | Palm et al. | 251—144 X |
| 2,953,345 | 9/1960 | Slemmons et al. | 251—144 |
| 3,103,341 | 9/1963 | Moran | 251—144 X |
| 3,211,422 | 10/1965 | Brown | 251—144 X |
| 3,219,054 | 11/1965 | Elder et al. | 137—307 |
| 3,290,003 | 12/1966 | Kessler | 251—318 |

WILLIAM F. O'DEA, *Primary Examiner.*

DENNIS H. LAMBERT, *Assistant Examiner.*

U.S. Cl. X.R.

251—144, 336